Dec. 7, 1943.  R. L. SARGISSON ET AL  2,336,129
LATCHING DEVICE
Filed Nov. 30, 1942  3 Sheets-Sheet 1

INVENTORS.
ROBERT L. SARGISSON
OSCAR W. HENRIKSON
BY
ATTORNEY

Dec. 7, 1943.  R. L. SARGISSON ET AL  2,336,129
LATCHING DEVICE
Filed Nov. 30, 1942  3 Sheets-Sheet 2

INVENTORS.
ROBERT L. SARGISSON
OSCAR W. HENRIKSON
BY
ATTORNEY

Dec. 7, 1943.  R. L. SARGISSON ET AL  2,336,129
LATCHING DEVICE
Filed Nov. 30, 1942  3 Sheets-Sheet 3

INVENTORS
ROBERT L. SARGISSON
OSCAR W. HENRIKSON
BY
ATTORNEY

Patented Dec. 7, 1943

2,336,129

UNITED STATES PATENT OFFICE 2,336,129

LATCHING DEVICE

Robert L. Sargisson, Berwyn, and Oscar W. Henrikson, Chicago, Ill., assignors to Automatic Electric Laboratories, Inc., a corporation of Delaware Application November 30, 1942, Serial No. 467,308

5 Claims. (Cl. 292—166)

The present invention relates in general to telephone substation equipment and more particularly to that type of telephone substation equipment which is to be used in exposed locations on shipboard, or in other places where the equipment is subject to rough usage, severe shocks, and adverse climatic conditions.

The general object of the invention is to provide an improved watertight compartment for mounting such equipment.

A further object of the invention is to provide an improved type of latching and locking mechanism for a casing whereby the cover thereon may be easily latched or unlatched.

A still further object of the invention is to provide a latching mechanism comprising a combination spring lock and cam lock which will withstand severe shocks or concussions such as encountered at battle stations or in gun turrets of fighting units in actual combat and which will prevent the door of the casing from being accidentally opened under such severe conditions.

A feature of the invention relates to the improved means for breaking the watertight seal between the cover of the casing and the base thereof when the latching mechanism is manually operated from a closed position to an open position.

Another feature of the invention relates to the improved means which closes the watertight seal between the cover of the case and the base thereof when the latching mechanism is operated from an open position to a closed position.

Further features of the invention relate to the general design of the various parts of the locking mechanism which are so rugged of construction that they will withstand unusually severe shocks and concussions without causing the cover to be sprung or accidentally opened.

The foregoing objects and features, with others, not specifically mentioned at this time, will best be understood by reference to the following specification and the accompanying drawings, in which.

Figure 1:
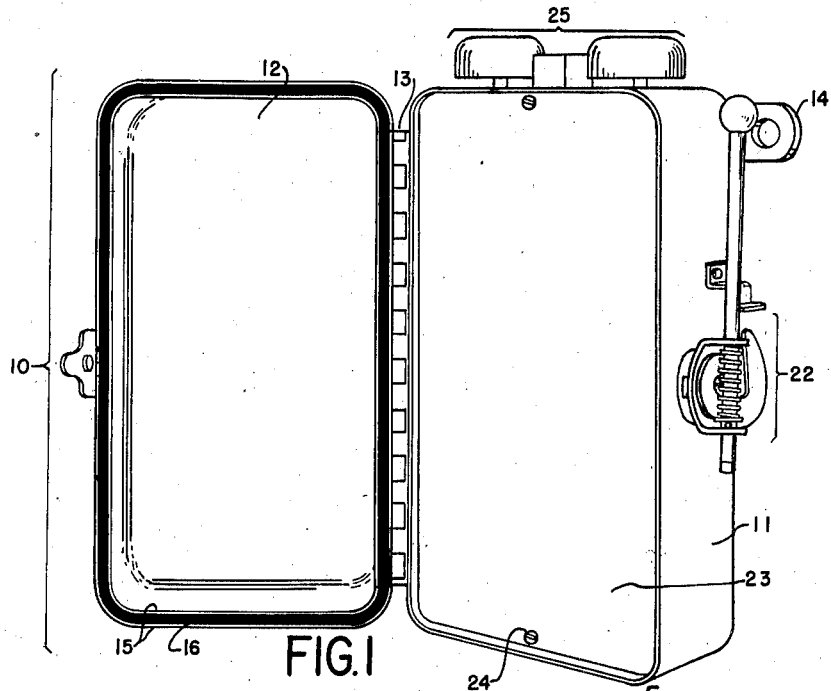
Fig. 1 is a perspective view of the casing and latching mechanism with the front cover shown in an open position.

Referring now to the drawings, a casing 10 is provided comprising a metal base 11, a metal cover 12 hinged to the base at 13, and a plurality of metal mounting brackets 14, only one of which is shown, for mounting the casing on a suitable wall or bulkhead.

The cover 12 is provided with a pair of strips 15 welded to the edge thereof to form a groove around the entire edge of the cover into which is fitted a rubber watertight sealing gasket 16. At the free end of the cover 12 an extended bar 17 is provided which is securely fastened to the cover by a plurality of rivets 18 and at the free end of the extended bar 17 a cover centering guide portion 19 is formed. Near the end of the extended bar 17 a keeper 20 is securely riveted to the extended bar 17 by means of a rivet 21. It should be understood that instead of securely riveting the keeper 20 to the extended bar 17, a freely rotatable keeper could be provided if desired. The keeper 20 constitutes a cam follower, as will be clearly understood hereinafter, whereby the latching mechanism securely clamps the cover 12 to the base 11 in order to seal the watertight sealing gasket, and whereby the latching mechanism breaks this seal when the locking lever 45 is operated to open the cover.

In Fig. 1, the base 11 of the casing 10, in addition to supporting the latching mechanism 22, also contains a blank face plate 23 secured within the base 11 by a plurality of screws 24, only two of which are shown, and a ringer mechanism 25 is mounted on the top thereof.

It should be understood that although applicant has shown a blank face plate 23, because the apparatus to be mounted within the casing and upon the face plate forms no part of applicant's invention, a face plate containing apparatus of the type disclosed in the application of H. F. Obergfell, Serial No. 445,129, filed May 30, 1942, may be substituted for applicant's blank face plate 23 and the ringer mechanism 25 shown on the top of the base 11 may be of the type disclosed in the above-mentioned Obergfell application. It should also be understood that screw plugs of the type disclosed in the Obergfell application may also be provided which plugs may be removed to provide openings for connecting with conduits containing the necessary electrical connections to the apparatus contained within the casing.

The latching mechanism 22, shown in an unlatched or open position in Fig. 1, will now be described in detail in connection with the drawings comprising Figs. 2–6, inclusive.

Figures 6, 7:
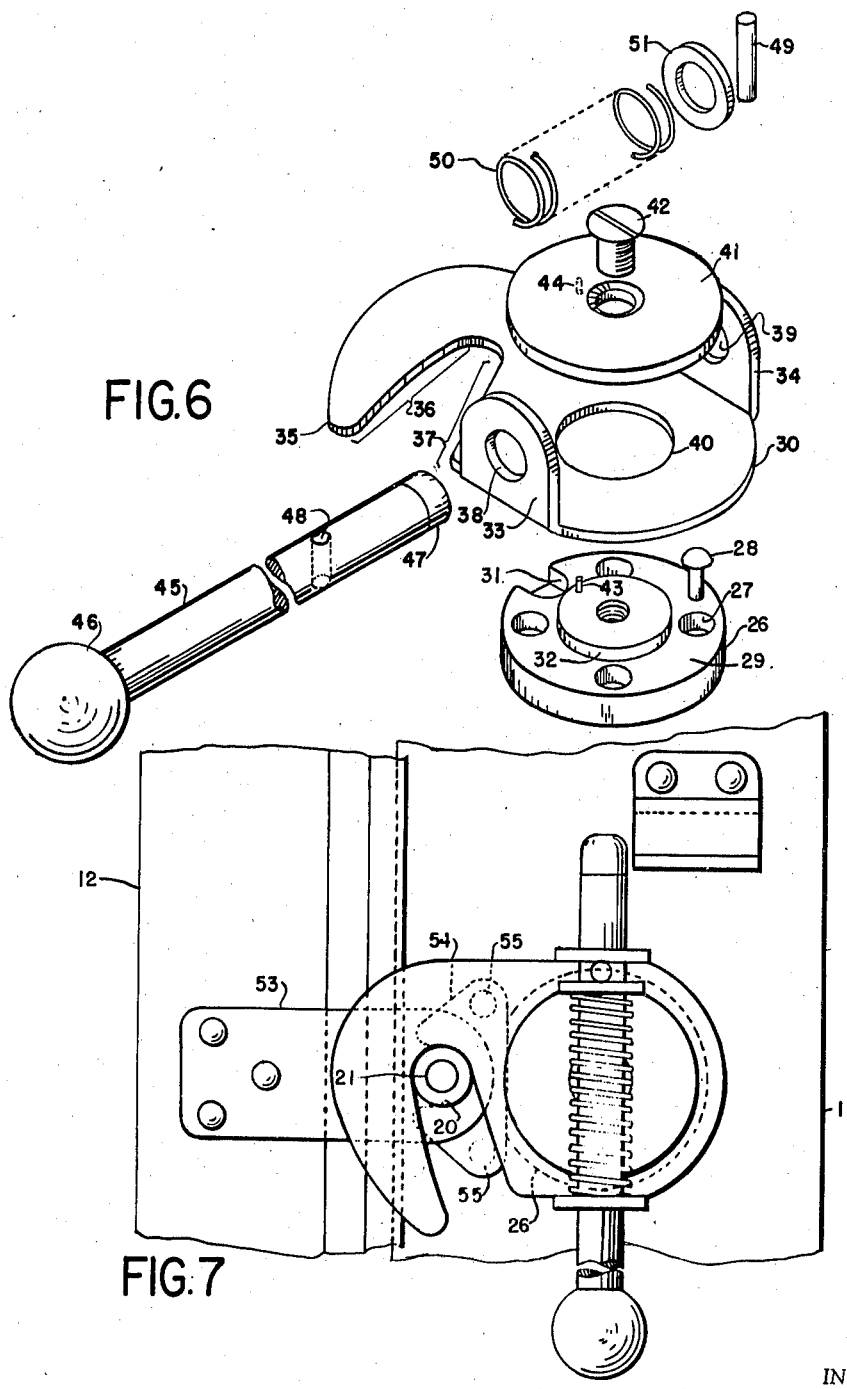
Fig. 6 is an exploded perspective view of the latching mechanism showing the details of the various parts thereof.
Fig. 7 is a fragmentary side view of the casing with the front cover closed and shows a modification of the latching mechanism shown in Figs. 1-6, inclusive.

Referring particularly to Fig. 6, a metal plate 26 is provided with four counter-bored holes 27, the depth of the counter-bored holes being such that the heads of the rivets 28 will be below the surface 29 when the plate is riveted in place upon the base 11, so as not to interfere with the latching member 30 as it is rotated to latch and unlatch the cover. The metal plate 26 is securely riveted to the base 11 with the centering guide receiving portion 31 in alignment with the centering guide portion 19 on the extended bar 17. Upon the upper surface of the plate 26 a hub 32 is provided which forms the bearing surface for the latching member 30. Attention is called to the fact that the hub 32 is slightly thicker than the thickness of the metal of the latching member 30 so that the latching member may be freely rotated on the hub 32 after the clamping plate 41 has been fastened in place against the upper surface of the hub 32 by means of the flat head retaining screw 42.

The latching member 30 is formed with two upwardly extending ears 33 and 34 and a hook 35 comprising two cam surfaces 36 and 37. A hole 38 is provided in the upwardly extending ear 33 and a hole 39 is provided in the upwardly extending ear 34, the purpose of which will be more apparent hereinafter. Furthermore, a bearing 40 is provided in the latching member 30 which is slightly larger in diameter than the hub 32 on the metal plate 26. By placing the latching member 30 on the metal plate 26 so that the bearing 40 engages the hub 32 and so that the underside of the latching member 30 engages the bearing surface 29, the latching member 30 may be readily rotated on the metal plate 26.

In order to retain the latching member 30 in its proper place upon the hub 32, a clamping plate 41, the underside of which also forms a bearing surface for the latching member 30, is provided which is securely fastened to the upper surface of the hub 32 by means of a flat head retaining screw 42.

As has been previously mentioned, the thickness of the material of the latching member 30 is slightly less than the thickness of the material forming the hub 32. It has also been mentioned that the bearing surface 29 on the plate 26, the bottom surface of the clamping plate 41, and the hub 32, form the bearing surfaces upon which the latching member 30 may be rotated. In order to prevent the clamping plate 41 from rotating whenever the latching member 30 is rotated and thereby loosen the flat head retaining screw 42, a small pin 43 is securely fastened to the upper surface of the hub 32. Furthermore, a pin receiving hole 44, which is not drilled clear through the clamping plate 41, is provided in the lower surface of the clamping plate to receive the pin 43 when the clamping plate is mounted in place upon the hub 32. It will be readily understood that when the clamping plate is fastened in place upon the upper surface of the hub 32 with the pin 43 inserted into the pin receiving hole 44, the clamping plate 41 is securely locked against rotation.

In order to manually control the latching member 30 a handle is provided comprising a metal locking lever 45, and a metal knob 46. At the end of the lever 45 a brass tip 47 is provided in order to form a slidable bearing surface for the end of the lever 45 as will be more clearly understood hereinafter. Furthermore, a pin receiving hole 48 is drilled through the lever 45 to receive a spring retaining pin 49.

In assembling the handle to the latching member, the lever 45 is inserted through the hole 38 in the upwardly extending ear 33. A helical spring 50 and a retaining washer 51 are slid over the shaft of the lever 45 as the lever is inserted through the hole 39 in the upwardly extending ear 34. With the parts in this position the helical spring 50 is compressed sufficiently, by any means available, between the upwardly extending ear 33 and the washer 51 to permit the spring retaining pin 49 to be inserted into the pin receiving hole 48. When the compression of the helical spring 50 is released, the pin 49 normally holds the spring slightly compressed so that the spring tension holds the pin 49 against the upwardly extending ear 34 with the tip 47 of the lever 45 extending through the hole 39 beyond the upwardly extending ear 34 as is clearly illustrated in Figs. 2, 4, 5, and 7. When these parts are assembled in this manner the holes 38 and 39 in the two upwardly extending ears 33 and 34 provide a slidable fit for the lever 45 and the knob 46 enables the user to pull the lever 45 against the tension of the spring 50 preparatory to rotating the lever 45 in a clockwise direction when the latching mechanism is operated from a latched to an unlatched position.

Figure 2:
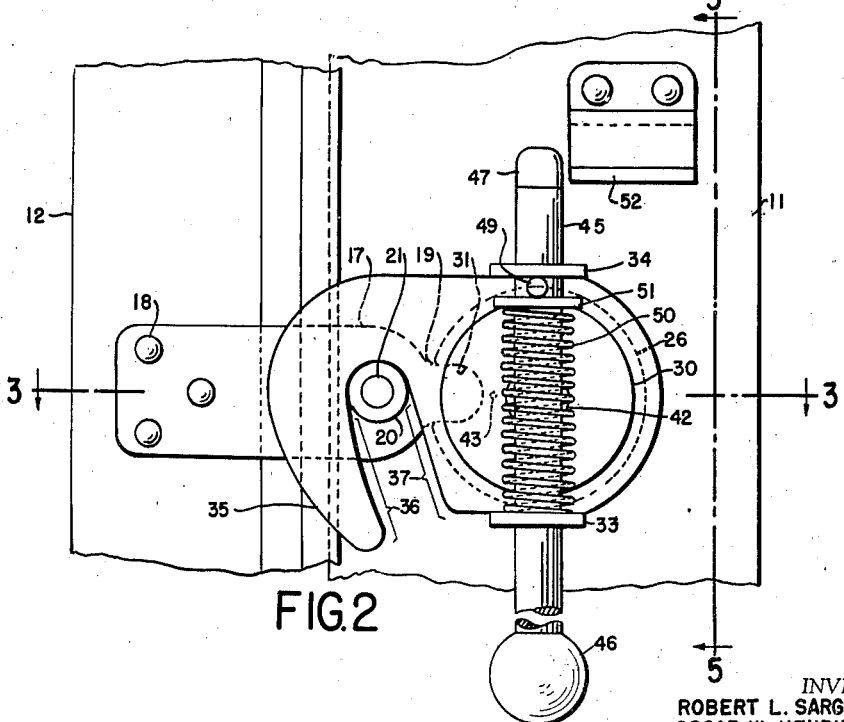
Fig. 2 is a fragmentary side view of the casing with the front cover closed and illustrates the latching mechanism in its locked position.
Figure 3:
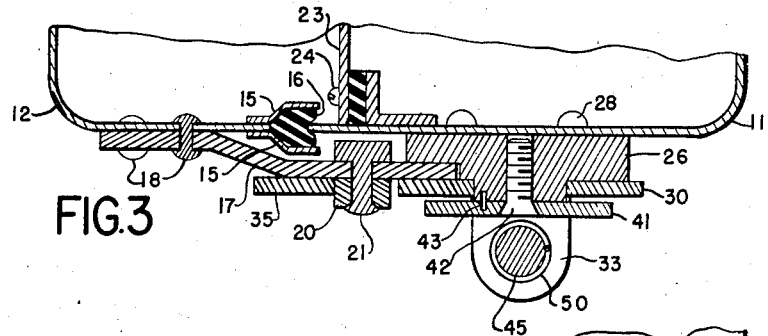
Fig. 3 is a cross-sectional view of the latching mechanism taken in the direction of the section line 3—3 of Fig. 2.

By referring to Fig. 3 it will be noted that when the latching mechanism 22 is in a locked position the rubber sealing gasket 16 is compressed, due to the fact that the edge of the base 11 has been forced into the rubber, thereby creating a watertight seal between the cover 12 and the base 11. With the latching mechanism in the locked position shown in Fig. 2, to unlatch the cover 12 the user must first pull the lever 45 downwardly, compressing the helical spring 50 sufficiently to enable the tip 47 on the lever 45 to clear the left-hand edge of the catch member 52. After the tip on the lever 45 has been pulled down sufficiently to clear the left-hand edge of the catch member 52 the user may then rotate the lever in a clockwise direction. After the lever 45 has been rotated sufficiently to permit the tip 47 to clear the left-hand edge of the catch member 52, the user may release the pull on the lever to permit the helical spring 50 to restore the lever to its normal position. As the lever is rotated the latching member 30 is also rotated, thereby permitting the cam portion 37 on the hook 35 to engage the keeper 20. When the rotation of the lever in a clockwise direction has reached the position shown in Fig. 4, it will be noted that the action of the cam portion 37 on the keeper 20 gradually causes the centering guide portion 19 to be forced out of the centering guide receiving portion 31. Since the centering guide portion 19 and the keeper 20 are mounted on the extended bar 17, and since the bar 17 is rigidly secured to the cover 12, the cover is forced open by the cam action between the cam portion 37 and the keeper 20. It should be understood that this cam action is an essential part of applicant's latching mechanism because, due to the clamping action between the cover 12 and the base 11, the compressed rubber gasket 16 has a tendency to stick rather securely, thus tending to prevent the cover 12 from being opened. If no cam action is provided, it may be necessary to pry the cover open, by means of a screw driver or some other tool, to break the watertight seal between the cover and the base. The lever 45 may now be rotated further by the user to the position shown in Fig. 1, at which position the catch member 52 acts as a stop member and prevents further rotation thereof. After the cover 12 has been forced open by the action of the cam surface 37, the cover may be swung open to the position shown in Fig. 1 in order that the user may gain access to the interior of the casing.

Figure 4:
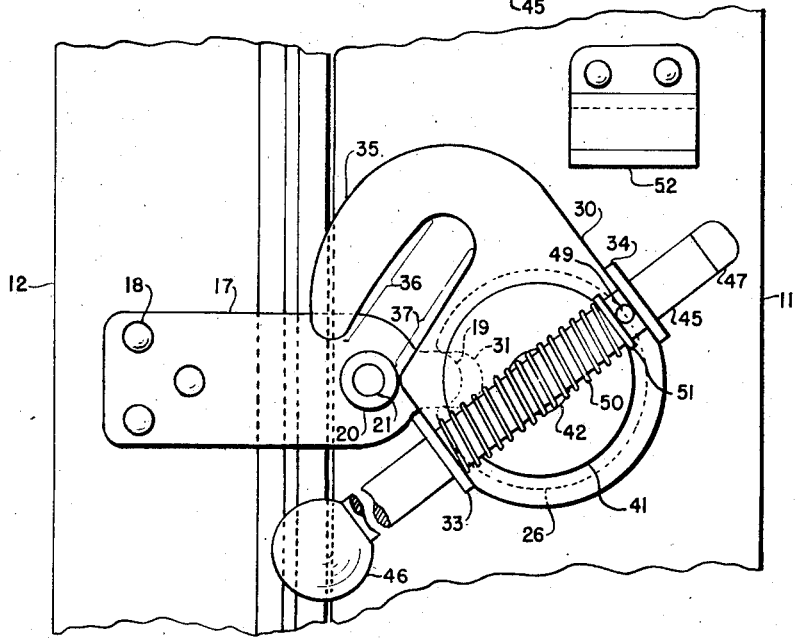
Fig. 4 is a fragmentary side view of the casing showing the latching mechanism in a partially open position and engaging the keeper on the extended bar of the front cover to forcibly break the watertight seal between the cover and the base.

In order to close the cover 12 and perfect the watertight seal between the cover 12 and the base 11, the user closes the cover 12 and then rotates the lever 45 in a counterclockwise direction from the position shown in Fig. 4. It may be well to mention that due to the resiliency of the rubber sealing gasket 16 the cover 12 is prevented from being completely closed by ordinary effort on the part of the user. However, the cover 12 is permitted to close sufficiently so that the cam surface 36 on the hook 35 engages the left-hand peripheral surface of the keeper 20 (Fig. 4) as the lever 45 is rotated in the counterclockwise direction. After the cam surface 36 has engaged the keeper 20 and as the lever 45 is further rotated in the counterclockwise direction, the cam action of the cam surface 36 upon the keeper causes the cover 12 to be gradually drawn against the edge of the base 11 thereby perfecting the watertight seal by compressing the rubber gasket 16. Furthermore, it should be noted that the centering guide portion 19 at the end of the extended bar 17 is gradually drawn into the centering guide receiving portion 31 on the metal plate 26 thereby preventing the cover 12 from being forced out of alignment.

Figure 5:
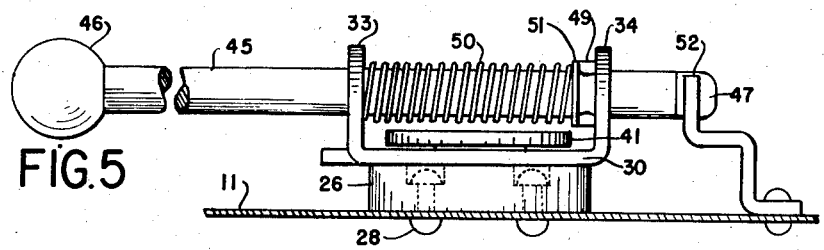
Fig. 5 is a side view of the latching mechanism taken in the direction of the section line 5—5 of Fig. 2.

It should also be noted by reference to Figs. 4 and 5 that the tip 47 on the lever 45 engages the underside of the catch member 52 as the lever 45 is rotated in the counterclockwise direction. Accordingly, the underside of the catch member 52 acts as a cam surface and causes the helical spring 50 to be compressed by the action of the tip 47 as it passes along the underside of the catch member 52 during the final stages of the rotation of the lever 45. When the tip 47 passes beyond the left-hand edge of the catch member 52 (Fig. 4), during the counterclockwise rotation of the lever, the helical spring 50 is released and it forces the lever 45 upwardly adjacent to the side of the left-hand edge of the catch member 52 to assume the position shown in Fig. 2.

It will be apparent from Fig. 2 that the catch member 52 in conjunction with the helical spring on the lever 45 acts as a snap lock in order to prevent clockwise rotation of the lever 45 unless the user deliberately performs the necessary action of pulling the lever 45 downwardly and then rotating the same in a clockwise direction when he desires to open the cover.

By referring to the modified form of latching mechanism shown in Fig. 7 it will be noted that it is quite similar to the latching mechanism shown in Figs. 1–6, inclusive. The main difference is limited to the use of the head of the rivet 21 as a centering guide for the cover 12 and the provision of a separate cover guide receiver plate 54 which is formed of a separate metal plate and riveted to the base 11. More specifically, the extended bar 53 is riveted to the cover 12 in the usual manner and the opposite end of the bar is rounded off to provide a smooth surface. Near the rounded end of the bar 53 the keeper 20 is riveted thereto by means of a rivet 21 to provide a cam follower in the same manner as has been disclosed in Fig. 2. The head of rivet 21, which is on the reverse side of the extended bar 53, has the same general contour as the keeper 20 and constitutes the centering guide for the cover 12 in the same manner as the centering guide 19 (Figs. 2 and 4). An independent centering guide receiving plate 54 is securely fastened to the base 11 by means of a plurality of rivets 55. In order to provide sufficient space to permit the centering guide receiving plate to be mounted, the circular metal plate 26 is cut off along the left edge thereof. All of the remaining parts of the latching mechanism and the operation thereof to latch and unlatch the cover are exactly the same as has been previously described.

From the foregoing description it will be apparent that when the cover 12 is in its latched position the entry of water or moisture into the inside of the casing is positively prevented and no damage to the apparatus mounted within the casing can result. It will also be apparent that applicant has devised a new and novel latching mechanism for a water-tight casing which mechanism will withstand tremendous shocks and concussions without permitting the cover to be accidentally opened but which mechanism can be readily controlled by the user to easily open the cover when desired.

In this connection, it is to be noted that when the cover 12 is closed and the latching mechanism is operated to the position shown in Fig. 2 to lock the cover 12, the cover centering guide is securely held by the centering guide receiving portion to positively prevent the cover from shifting out of alignment with respect to the base 11. Furthermore, the hook portion of the latching member securely holds the keeper and consequently the cover 12 to prevent the cover from being forced open under any shock or concussion, such as encountered at battle stations on board fighting units. To insure that the cover is prevented from springing open under such severe shock or shell concussions, the locking lever is prevented from being rotated in a clockwise direction by the catch member 52 and is prevented from rotating in a counterclockwise direction by the combination of the hook portion 35 and the keeper 20.

What is claimed is:

1. A latching mechanism for two relatively movable closure members having a keeper secured to one member, comprising a latch secured to the other of said two members, said latch including a pair of cam surfaces adapted to engage the keeper, means for actuating said latch into engagement with the keeper to cause one of said cam surfaces to gradually draw said two members tightly together, restraining means for restraining return movement of said latch actuating means after said two members have been tightly drawn together, and resilient means cooperating with said latch actuating means compressible to permit said latch actuating means to be withdrawn from the influence of said restraining means and actuated to cause the other of said pair of cam surfaces to gradually disengage the keeper to force said two members apart from one another.

2. In a latching mechanism having a latch cam adapted to engage a keeper, a handle slidably mounted upon said latch cam for rotating said latch cam in one direction into engagement with the keeper and for rotating said latch cam in the opposite direction to disengage the latch cam from the keeper, resilient means normally exerting a pressure to force said slidable handle in one direction on said latch cam, and catch means in the path of rotation of said handle and engageable therewith, as said handle is rotated to engage said latch cam with the keeper, for sliding said handle in one direction against the pressure exerted by said resilient means to permit said handle to be rotated beyond said catch means and to thereafter permit said resilient means to restore said handle to its normal position, said catch means preventing the rotation of said handle and latch cam in said opposite direction except when external pressure is exerted on said handle to overcome the pressure of said resilient means.

3. In a latching mechanism having a hook member adapted to engage a keeper, a slidable handle on said hook member for rotating it in a first direction to engage said keeper and for rotating it in a second direction to disengage said keeper, a spring member normally maintaining said slidable handle in a first position on said hook member, means interposed in the path of rotation of said handle in said first direction for sliding said handle from said first position to a second position to thereby compress said spring member and permit said handle to be rotated beyond said interposing means, said spring thereafter restoring said slidable handle to said first position to thereby prevent rotation of said handle in said second direction unless said slidable handle is manually moved to said second position.

4. In a latching mechanism having a hook member adapted to engage and disengage a keeper, a spring controlled handle for controlling said hook member, a cam surface on said handle, a catch member in the path of rotation of said handle, said cam surface effective upon rotation of said handle, in a direction to engage said catch member, to gradually compress the spring of said handle to permit said cam surface to be moved beyond said catch member as the handle is further rotated, said spring effective thereafter to restore said handle and cam surface to such a position that rotation of said handle in the opposite direction is prevented by said catch means.

5. In a latching mechanism including a spring control handle having a cam surface, catch means in the path of rotation of said handle, said cam surface operated by rotation of said handle upon engagement with said catch means to cause compression of said spring and movement of said handle to permit said cam surface to be moved beyond said catch means as the handle is further rotated, said spring effective thereafter to restore said handle and cam surface to such a position that rotation of said handle in the opposite direction is prevented by said catch means.

ROBERT L. SARGISSON.
OSCAR W. HENRIKSON.